United States Patent
Doerr

(10) Patent No.: US 8,302,756 B2
(45) Date of Patent: Nov. 6, 2012

(54) CLUTCH ACTUATION DEVICE FOR A MANUAL TRANSMISSION OF A VEHICLE AND CORRESPONDING CONTROL METHOD

(75) Inventor: Wolfgang Doerr, Eichenau (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 379 days.

(21) Appl. No.: 12/615,603

(22) Filed: Nov. 10, 2009

(65) Prior Publication Data

US 2010/0133058 A1    Jun. 3, 2010

Related U.S. Application Data

(63) Continuation of application No. PCT/EP2008/003365, filed on Apr. 25, 2008.

(30) Foreign Application Priority Data

May 11, 2007 (DE) .......................... 10 2007 022 792

(51) Int. Cl.
*F16D 48/06* (2006.01)
(52) U.S. Cl. ................... 192/85.63; 192/30 W
(58) Field of Classification Search ........................ None
See application file for complete search history.

(56) References Cited

U.S. PATENT DOCUMENTS

| | | | |
|---|---|---|---|
| 5,004,086 A | 4/1991 | Petzold et al. | |
| 5,217,097 A * | 6/1993 | Lasoen | 192/83 |
| 5,337,868 A * | 8/1994 | Liu et al. | 477/74 |
| 5,678,671 A * | 10/1997 | Leimbach et al. | 192/85.57 |
| 6,256,570 B1 | 7/2001 | Weiberle et al. | |
| 6,290,045 B1 | 9/2001 | Klatt | |
| 6,575,283 B2 | 6/2003 | Drexl et al. | |
| 2001/0052444 A1 | 12/2001 | Drexl et al. | |
| 2002/0148699 A1* | 10/2002 | Mack et al. | 192/83 |
| 2007/0080040 A1 | 4/2007 | Bader et al. | |
| 2007/0205072 A1 | 9/2007 | Villata et al. | |

FOREIGN PATENT DOCUMENTS

| | | |
|---|---|---|
| DE | 198 56 587 A1 | 6/1999 |
| DE | 198 26 132 A1 | 12/1999 |
| DE | 100 18 649 A1 | 10/2001 |
| DE | 101 45 437 A1 | 6/2002 |
| DE | 100 65 023 A1 | 7/2002 |
| DE | 101 07 962 A1 | 8/2002 |
| DE | 203 15 735 U1 | 1/2004 |
| DE | 102 50 729 A1 | 5/2004 |

(Continued)

OTHER PUBLICATIONS

German Office Action dated Dec. 17, 2007 including English translation (Six (6) pages).

(Continued)

*Primary Examiner* — Rodney Bonck
(74) *Attorney, Agent, or Firm* — Crowell & Moring LLP

(57) ABSTRACT

A clutch actuation device, particularly for a manual transmission of a vehicle, in particular a commercial vehicle, includes a clutch actuation setting device that can be placed in various settings, based on which a corresponding actuation of the clutch takes place. The clutch actuation setting device is suitable for generating electrical signals as a function of the setting, based on which the clutch is correspondingly actuated. A method controls/regulates such a clutch actuation device, particularly for a manual transmission of a vehicle.

13 Claims, 1 Drawing Sheet

FOREIGN PATENT DOCUMENTS

| | | |
|---|---|---|
| DE | 10 2005 026 472 A1 | 1/2006 |
| DE | 10 2005 028 122 A1 | 12/2006 |
| EP | 1 010 912 A1 | 6/2000 |
| EP | 1 342 930 A2 | 9/2003 |
| EP | 1 772 645 A2 | 4/2007 |
| FR | 2 807 808 A1 | 10/2001 |
| FR | 2 862 114 A1 | 5/2005 |
| JP | 5-1727 A | 1/1993 |
| WO | WO 88/10376 A1 | 12/1988 |
| WO | WO 02/25130 A1 * | 3/2002 |
| WO | WO 03/019026 A1 | 3/2003 |

OTHER PUBLICATIONS

International Search Report dated Aug. 21, 2008 including English translation (Eight (8) pages).

German Office Action dated Aug. 25, 2011 including English-language translation (Ten (10) pages).

* cited by examiner

CLUTCH ACTUATION DEVICE FOR A MANUAL TRANSMISSION OF A VEHICLE AND CORRESPONDING CONTROL METHOD

CROSS-REFERENCE TO RELATED APPLICATIONS

This application is a continuation of PCT International Application No. PCT/EP2008/003365, filed Apr. 25, 2008, which claims priority under 35 U.S.C. §119 to German Patent Application No. DE 10 2007 022.792.4, filed May 11, 2007, the entire disclosures of which are herein expressly incorporated by reference.

BACKGROUND AND SUMMARY OF THE INVENTION

The invention relates to clutch actuation device, particularly for a manual transmission of a vehicle, in particular a commercial vehicle, having a clutch actuation setting device that can be placed in various positions, on the basis of which a corresponding operation of a clutch ensues.

The invention further relates to a method for controlling/regulating a clutch actuation device, particularly for a manual transmission of a vehicle, in particular a commercial vehicle, the clutch actuation device including a clutch actuation setting device that can be placed in various positions, on the basis of which a corresponding operation of the clutch ensues.

In connection with manual transmissions, clutch actuation devices of the generic type usually include clutch actuation setting devices in the form of clutch pedal devices with foot-operated clutch pedals, which are generally hydraulically coupled to an operating cylinder. The hydraulic operating cylinder is in turn mechanically coupled to a clutch operating device, for example a central clutch operator, which serves for the direct operation of a clutch. In order to reduce at least partially the force that has to be exerted by the clutch pedal for operation of the clutch, various forms of clutch servo assistance are generally used. For example, the clutch pedal device may include a so-called hydraulic master or main cylinder, which is mechanically coupled to a foot-operated clutch pedal. In this case a clutch servo embodied as an operating cylinder may be equipped with a hydraulic slave cylinder coupled to the master cylinder of the clutch pedal device. The clutch servo is also at the same time coupled to a pneumatic system, in order to provide clutch servo assistance through interaction with the slave cylinder.

Provision can also be made for clutch servo assistance virtually within the clutch pedal device. The clutch pedal device is accordingly already coupled to the pneumatic system, in particular the master cylinder of the clutch pedal device. The master cylinder is coupled to the hydraulic operating cylinder. Through interaction of the master cylinder with the pneumatic system, the clutch servo assistance is already incorporated in the clutch pedal device, which by way of the hydraulic coupling actuates the operating cylinder, in this case embodied as a hydraulic slave cylinder. In these clutch actuation devices of the prior art for manual transmissions, the use of the hydraulic actuation or coupling makes no provision for a clutch or transmission control device or transmission control electronics. In manual transmissions in commercial vehicles, the clutch is therefore operated at least partially through the use of such hydraulic systems. Their incorporation into an overall system, however, makes the overall system very costly and also expensive to service. Special functions, such as clutch monitoring functions, clutch closure detection, clutch wear optimization and clutch overload protection, for example, can be achieved only at additional cost.

The object of the invention is therefore to develop the clutch actuation devices of the generic type and methods for controlling/regulating such clutch actuation devices in such a way that the aforesaid disadvantages can be at least partially overcome and, in particular, so that a clutch actuation device of increased functionality is created.

This object is achieved by a clutch actuation device and method of controlling the device, particularly for a manual transmission of a vehicle, in particular a commercial vehicle, having a clutch actuation setting device that can be placed in various positions, on the basis of which a corresponding operation of the clutch ensues. The clutch actuation setting device is suited, as a function of its position, to generating electrical signals, on the basis of which the clutch is correspondingly operated.

Advantageous embodiments and developments of the invention are described herein.

The clutch actuation device according to the invention provides a clutch actuation setting device that is suited to generating electrical signals as a function of its position, on the basis of which the clutch is correspondingly operated. In this context, the clutch actuation setting device is preferably a clutch pedal device, which includes a foot-operated clutch pedal. It is also equally feasible, however, to use a lever for the clutch actuation setting, for example in vehicles such as motorcycles. The electrical signals may be generated by an inexpensive clutch pedal sensor, for example. The fact that the clutch actuation setting device only generates and delivers electrical signals as a function of its position means that a so-called clutch-by-wire system for manual transmission is created. The clutch actuation setting device embodied as a clutch pedal device with clutch pedal therefore delivers a purely electrical control variable. This affords the advantage, among other things, that the clutch actuation device can be mechanically simplified, since no hydraulic coupling is needed for connecting the clutch pedal device to a clutch servo or a hydraulic operating cylinder. The absence of the hydraulic coupling therefore saves both costs and the overall space required for this coupling. Where the clutch pedal device including a clutch pedal is used, it is possible by choosing a suitable spring, for example, to generate any desired counterforce characteristic for operation of the clutch pedal, since the clutch pedal device is completely isolated pneumatically and hydraulically and only has an electrical connection through the clutch pedal sensor. Inexpensive and simple electrical sensor switches can thereby be used to generate the electrical signal.

The clutch actuation device according to the invention can advantageously be developed in that the clutch actuation setting device is suited to delivering the electrical signals to a control unit, which on the basis of the electrical signals causes a pressure to be applied to a clutch operating device for operation of the clutch. This makes it possible, for example, to adjust the degree of pressure applied to the clutch operating device by way of a valve device. A clutch regulating device or clutch regulating module is preferably formed through the integration of the control unit or control electronics with the valve device including the necessary solenoid valves for actuation of the clutch operating device. This clutch regulating module can then preferably be mounted externally on the manual transmission, in particular on a clutch bell-housing. This affords greater interchangeability when servicing.

The provision of the clutch regulating module in connection with the manual transmission furthermore also makes it possible to utilize the advantages of an automated clutch control. For example, it is possible to monitor the clutch plate wear, since a clutch position can be relayed to the control unit, for example by way of a CAN bus. It is furthermore also possible to minimize the clutch plate wear. This is done by, among other things, calculating the clutch load as a function of a rotational speed, a torque, a slip etc. and by a 'harder engagement' of the clutch on the basis of a correspondingly defined clutch pedal position; for example when the driver of the vehicle keeps the clutch in a slipping position for an unnecessary length of time, so that a full engagement of the clutch then ensues despite the clutch pedal being only partially depressed.

The clutch regulating module can also be used to provide an overload protection. Owing to the complete hydraulic, pneumatic and mechanical isolation of the clutch pedal device from an operating cylinder, it is possible to achieve an adjustment of the clutch pedal characteristic, for example through electronic optimization of the clutch characteristic curve.

In addition, all diagnostic functions can be performed by the clutch regulating module. Communication with other vehicle control modules is also possible, for example communication with a control module of an electronic braking system; in this case this communication may consist, for example, in opening the clutch in the event of an antilock braking mode instituted by an ABS system, thereby interrupting a power flow in a drivetrain in the event of ABS control. Similarly communication may also be provided between ESP electronics or an ESP control unit for the execution of an electronic stability program, which serves to interrupt the drivetrain in the event of ESP control. Communication can likewise be established with ASC electronics or an ASC control unit for acceleration skid control, in which, for example, an 'automated' starting is permitted with a slipping clutch even when the clutch pedal is not being operated, in order to prevent wheel spin on the drive wheels of the vehicle.

In addition it is also possible to achieve an interaction with a halt brake system or to combine the control/regulation through the clutch regulating module with a so-called hillholder function. Thus, when bringing the vehicle to rest on an incline, a braking force is maintained without the need to operate a parking brake or a handbrake of the vehicle. At the same time an automated disengagement of the clutch can be undertaken, if the driver fails to do this, in order to prevent stalling of the internal combustion engine of the vehicle. The vehicle is then driven off again by operating an accelerator pedal, the clutch being automatically engaged. An interaction is also possible with a transmission control connected to a gearbox servo, which permits release of the gearbox servo (power-assisted gearshift) only when the clutch is operated, for example.

Further advantages also accrue in connection with the clutch operating device embodied as an operating cylinder. Thus the operating cylinder may be fitted externally to a clutch bell housing and preferably integrated into the clutch regulating module. Alternatively, the operating cylinder may also be designed separately, for example as a central clutch operator. A travel or position sensor is preferably provided directly in the operating cylinder. A separate evaluation unit for this sensor may be arranged either in the operating cylinder or also on the clutch regulating module, for example.

In order to enhance the reliability of such a clutch-by-wire system, redundant components can be incorporated into the clutch actuation device. In particular, for example, the clutch pedal device may deliver two mutually independent electrical signals for the clutch pedal position or clutch pedal setting, for example via two different electrical lines from two corresponding sensors. Four electrical lines may equally well be provided, in order to provide the clutch regulating module with two supply voltages and two ground connections. This serves at least greatly to reduce any probability of failure on the part of the clutch regulating module. With regard to the adjustment of the pressure applied to the clutch operating device, the valve device may include redundant solenoid valves both for ventilation and venting of the clutch operating device. The operating cylinder may likewise supply the clutch regulating module with two mutually independent electrical signals for the release travel of the clutch via two electrical lines.

In addition, the clutch actuation device according to the invention can also be embodied so that a valve device is provided, which is suited to applying a pressure to the clutch operating device. For example, the valve device may include two ventilation valves, connected in parallel, for ventilation of the clutch operating device, one of the two solenoid valves having a large flow cross section and the other having a small or smaller flow cross section. The clutch operating device can therefore be ventilated with different volumetric flows. Similarly, two solenoid valves having different flow cross sections that are connected in parallel are preferably also used for venting the clutch operating device. These solenoid valves for ventilation and venting are, in particular, embodied as 2/2-way valves.

The clutch actuation device according to the invention may further be embodied in such a way that the clutch actuation setting device is suited to generating further electrical signals as a function of its position, and delivering these further electrical signals to a further control unit. The further control unit is suited to delivering the further electrical signals to the control unit. Provision of the further control unit serves further to enhance the reliability of the clutch-by-wire system. In this context, the clutch pedal device preferably delivers two mutually independent electrical signals, the first signal being supplied to the control unit, which is assigned to the clutch regulating module, for example, whilst the second signal is supplied to the further control unit, for example via a CAN bus. This further control unit may in particular be any vehicle control module, which in turn delivers the further signals to the control unit assigned to the clutch regulating module, for example likewise via a CAN bus. Both the control unit of the clutch regulating module and the further control unit may obviously be in communication with any vehicle control modules via the CAN bus. In this case, for example, it is possible to separate the drivetrain of the vehicle through the clutch when the antilock brake control is activated by the ABS system.

It is furthermore possible, particularly when a system failure of the clutch actuation device is registered, for the drivetrain of the vehicle to be correspondingly shifted to an idling state either manually via the gearbox or preferably electronically on the basis of the corresponding control module, if the manual transmission is designed to allow this. In this context, it may be particularly advantageous for the manual transmission, where necessary, to initiate semi-automatic running if the manual transmission is designed to allow this. For example, on operation of the gearshift lever, a clutch operation may be triggered via a sensor so that the driver no longer needs to operate the clutch pedal when shifting gear whilst underway. In this case the clutch pedal is only needed for driving off and maneuvering.

The clutch actuation device according to the invention is preferably embodied so that a travel sensor is provided, which serves to detect a position of the clutch operating device, and on the basis of the signals from which it is possible to control/regulate the clutch operating device.

In this context, the clutch actuation device according to the invention can be developed in such a way that a pressure sensor is furthermore provided, by which the position of the clutch operating device can be determined, at least in the event of a failure of the travel sensor, and on the basis of the signals from which it is possible to control/regulate the position of the clutch operating device. Even in the event of a failure of the position or travel sensor in the clutch operating device, this will allow an emergency control by way of the pressure sensor incorporated in the clutch regulating module, for example. However, the pressure sensor may equally well be provided in order to improve the control quality through interaction with the travel sensor.

The clutch actuation device may furthermore be embodied so that one or more of the following components are accommodated in a housing in a mechatronic unit: the control unit, the valve device, the travel sensor, the pressure sensor, and the clutch operating device.

The method according to the invention operates in that the clutch actuation setting device generates electrical signals as a function of its position, on the basis of which the clutch is correspondingly operated. In the same or a similar way, this affords the advantages explained in connection with the clutch actuation device according to the invention, so that in order to avoid repetition reference will be made to the corresponding descriptions in connection with the clutch actuation device according to the invention.

The same applies analogously to the following preferred embodiments of the method according to the invention, so that again in order to avoid repetition reference will be made to the corresponding descriptions in connection with the clutch actuation device according to the invention.

The method according to the invention can advantageously be developed in that the clutch actuation setting device delivers the electrical signals to a control unit, which on the basis of the electrical signals causes a pressure to be applied to a clutch operating device for operation of the clutch.

The method according to the invention can furthermore be embodied so that a valve device applies pressure to the clutch operating device.

In addition, the method according to the invention may be embodied in such a way that the clutch actuation setting device generates further electrical signals as a function of its position and delivers these further electrical signals to a further control unit, the further control unit being suited to delivering the further electrical signals to the control unit.

The method according to the invention can furthermore be embodied so that a position of the clutch operating device is detected by a travel sensor, and the position of the clutch operating device is controlled/regulated on the basis of signals from the travel sensor.

In this context the method according to the invention can be developed in such a way that by use of a pressure sensor the position of the clutch operating device can be determined, at least in the event of a failure of the travel sensor, and the position of the clutch operating device is controlled/regulated on the basis of the signals from the pressure sensor.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
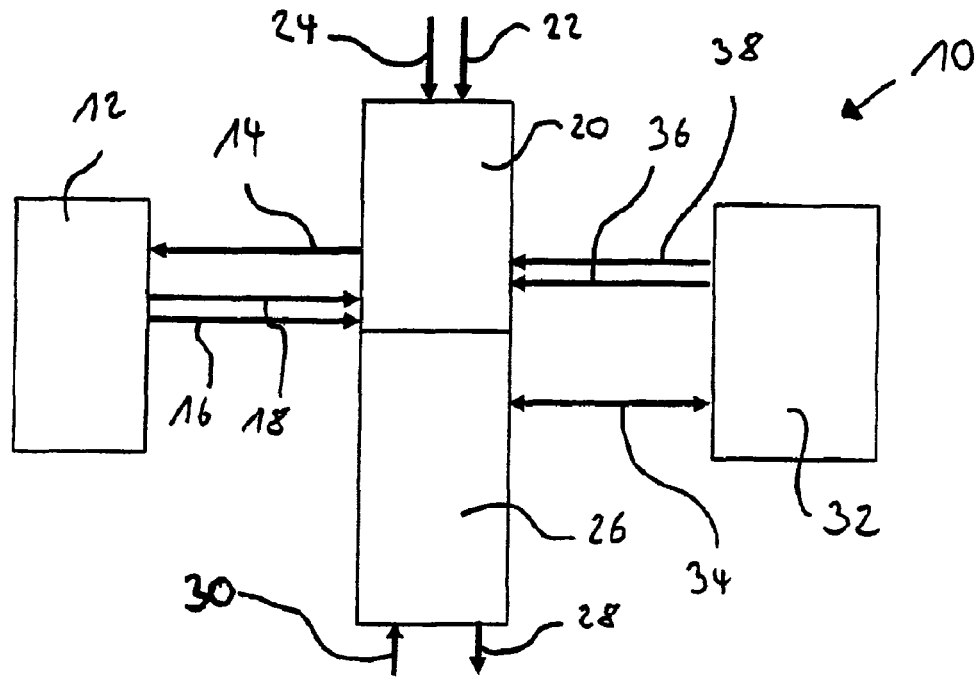
FIG. 1 is a schematic representation of a clutch actuation device according to the invention in a first exemplary embodiment, which is suited to performing the method according to the invention.

FIG. 1 shows a schematic representation of a clutch actuation device 10 in a first exemplary embodiment of the invention which is suited to performing the method according to the invention. In this exemplary embodiment, the clutch actuation device 10 is intended for a manual transmission of a commercial vehicle and includes a clutch actuation setting device 12. The clutch actuation setting device 12 is embodied as a clutch pedal device with a foot-operated clutch pedal, which can be operated by a driver of the commercial vehicle, for example.

The clutch actuation setting device 12 is designed so that it generates electrical signals as a function of its position, for example the position of the clutch pedal, and delivers these to a control unit 20. These signals are generated, for example, by a sensor, in particular a clutch pedal sensor, assigned to the clutch actuation setting device 12. For this purpose, the clutch actuation setting device 12 is coupled to the control unit 20 via a power supply lead 14, so that the control unit 20 can supply electrical current to the clutch actuation setting device 12. The clutch actuation setting device 12 is furthermore coupled to the control unit 20 via a signal line 16 and a further signal line 18, which in particular form two inverted signal outputs of the clutch actuation setting device 12, in order to supply the control unit 20 with signals correlating with a clutch pedal position. The further signal line 18 is here intended to create a redundancy.

Electrical current is delivered to the control unit 20 via a power supply lead 22 and a further power supply lead 24. The further power supply lead 24 is intended to create a redundancy. In the case shown, the control unit 20 is furthermore coupled to a valve device 26, to which compressed air can be fed via a valve device ventilation 30 and from which compressed air can be discharged via a valve device venting 28. The valve device 26 is here actuated by the control unit 20, so that the valve device 26 can feed a defined flow of compressed air to a clutch operating device 32 by way of the valve device ventilation 30, and the valve device 26 can discharge a defined flow of compressed air from the clutch operating device 32 via the valve device venting 28. For this purpose, the valve device 26 is coupled to the clutch operating device 32 via a coupling 34, in particular a pneumatic line. The valve device 26 may in this case be a valve device, known to the person skilled in the art, which includes a plurality of 2/2-way valves for proportioning the ventilation and venting volumetric flows.

The clutch operating device 32 serves for the operation of a clutch (not shown), that is to say for the engagement and release of a clutch of a commercial vehicle, and is embodied, in particular, as a central clutch operator. In order to determine a position of the clutch operating device 32, the latter includes a travel or position sensor, not shown in FIG. 1, which serves to detect the position of the clutch operating device. In this exemplary embodiment, the signals from the travel sensor are delivered to the control unit 20 via a travel sensor signal line 36 and a further travel sensor signal line 38, which in particular form two inverted signal outputs of the travel sensor. The further travel sensor signal line 38 here again serves to provide redundancy. The control unit 20 and the valve device 26 in particular, and optionally also the travel sensor and the clutch operating device 32, are preferably formed in a housing in a mechatronic unit.

The method according to an exemplary embodiment for controlling/regulating the clutch actuation device 10 operates as follows. It is assumed that the driver of the commercial vehicle intends to change gear using the manual transmission. For this purpose, the driver operates the clutch actuation setting device 12, in particular the clutch pedal of the clutch pedal device. The clutch actuation setting device 12 is thereby brought into a position which is intended to bring about a complete release of the clutch and hence an interruption of the power flow in the drivetrain of the commercial vehicle. The clutch actuation setting device 12 consequently generates corresponding electrical signals as a function of this position and delivers these signals to the control unit 20. The control unit 20 evaluates these signals and, in this case, determines that the clutch is to be fully released. The control unit 20 therefore actuates the valve device 26 accordingly. The valve device 26 consequently switches its valves over in such a way that pressure is applied to the clutch operating device 32 for operation of the clutch on the basis of the actuation by the control unit 20 and hence on the basis of the electrical signals from the clutch pedal device. The clutch operating device 32 accordingly operates the clutch, which undertakes the corresponding complete release movement and thereby interrupts the power flow in the drivetrain of the vehicle. This process can be transferred analogously to all positions of the clutch ranging from a fully engaged clutch to a fully released clutch. In order to monitor the exact position of the clutch, which correlates with the position of the clutch operating device 32, the clutch operating device 32 includes the travel sensor (not shown). The travel sensor therefore determines the exact position of the clutch operating device 32 and delivers signals, correlating with the position of the clutch operating device 32, to the control unit 20. On the basis of these signals from the travel sensor and also as a function of the electrical signals from the clutch pedal device, the control unit 20 is able to control/regulate the position of the clutch operating device 32.

Figure 2:
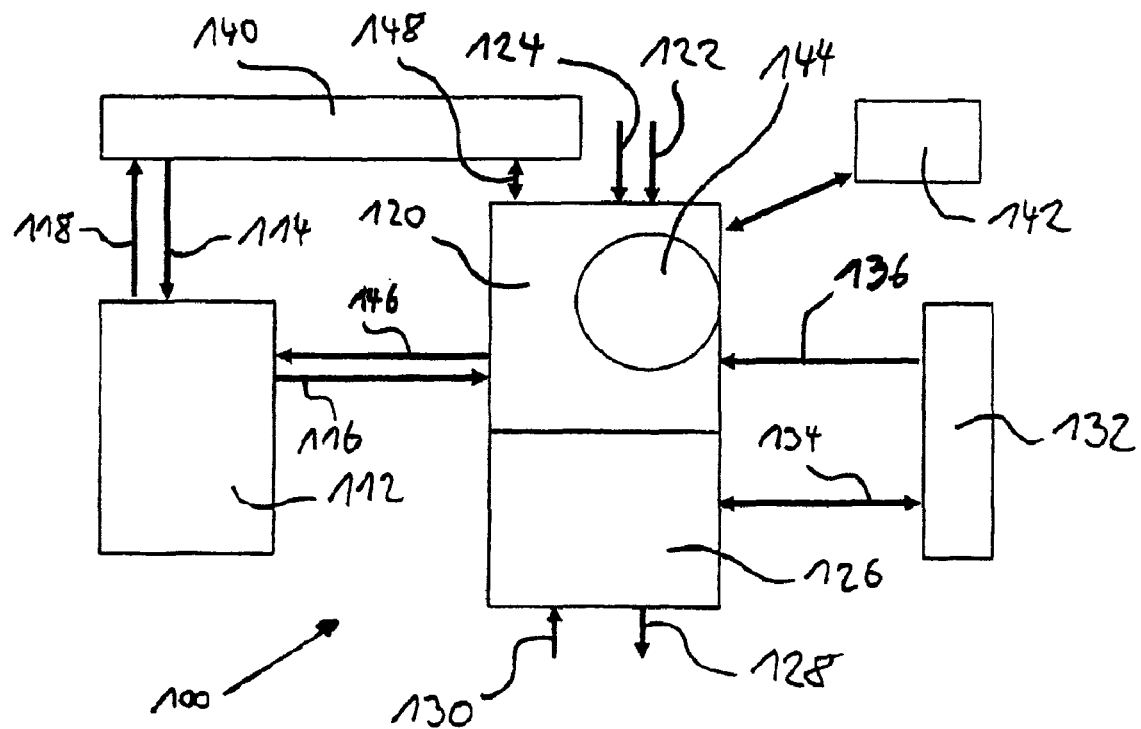
FIG. 2 is a schematic representation of a clutch actuation device according to the invention in a second exemplary embodiment, which is suited to performing the method according to the invention.

FIG. 2 shows a schematic representation of a clutch actuation device 100 in a second exemplary embodiment which is suited to performing the method according to the invention. In order to avoid repetition, it is proposed in the description of this exemplary embodiment to examine only the differences compared to the first exemplary embodiment, identical or similar components of the clutch actuation device 100 being denoted by similar reference numerals. In this exemplary embodiment, the clutch actuation setting device 112 is coupled on the one hand to the control unit 120 via a power supply lead 146 and a signal line 116. On the other hand, the clutch actuation setting device 112 is coupled to a further control unit 140, for example a drivetrain control unit, via a power supply lead 114 and a signal line 118. In particular, the clutch actuation setting device 112 may include two mutually independent sensors, in particular clutch pedal sensors, which each generate the electrical signals. The further control unit 140 is coupled to the control unit 120 via a CAN bus 148. The clutch actuation setting device 112 can therefore deliver its electrical signals to the control unit 120 on the one hand and to the further control unit 140 on the other. The further control unit 140 can in turn deliver the signals supplied to it to the control unit 120 via the CAN bus 148. Should one of the signal lines 116, 118 and/or one of the power supply leads 146, 114 fail, therefore, the generation of the electrical signals and the transmission of the electrical signals to the control unit 120 is assured. The control unit 120 further includes a pressure sensor 144 for monitoring a pressure in the clutch operating device 132, for example by determining the pressure in the valve device 126 or in the coupling 134. In addition, the control unit 120 has a communications interface or multiple control interfaces 142 for communication with other control modules of the vehicle, for example with a control module assigned to an electronic braking system (EBS). In this exemplary embodiment, the control unit 20 and the valve device 126 in particular, and optionally also the pressure sensor 144 and the clutch operating device 132, are preferably formed in a housing in a mechatronic unit.

The method for controlling/regulating the clutch actuation device 100 in this exemplary embodiment differs from that in the first exemplary embodiment in that the clutch actuation setting device 112 additionally generates further electrical signals as a function of its position and delivers these further electrical signals to the further control unit 140. The further control unit 140 delivers the further electronic signals to the control unit 120. In this exemplary embodiment, the control/regulation of the position of the clutch operating device 132 can also be undertaken on the basis of signals from the pressure sensor 144. The pressure sensor 144 serves in particular for determining the position of the clutch operating device 132 in the event of the travel sensor failure or in order to improve the control quality. The position of the clutch operating device 132 is controlled/regulated on the basis of signals from the pressure sensor 144 and, in the case of the improvement in control quality, from the travel sensor.

TABLE OF REFERENCE NUMERALS 10 clutch actuation device
12 clutch actuation setting device
14 power supply lead
16 signal line
18 further signal line
20 control unit
22 power supply lead
24 further power supply lead
26 valve device
28 valve device venting
30 valve device ventilation
32 clutch operating device
34 coupling
36 signal line
38 further signal line
100 clutch actuation device
112 clutch actuation setting device
114 power supply lead
116 signal line
118 further signal line
120 control unit
122 power supply lead
124 further power supply lead
126 valve device
128 valve device venting
130 valve device ventilation
132 clutch operating device
134 coupling
136 signal line
140 further control unit
142 communications interface
144 pressure sensor
146 power supply lead
148 CAN bus The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A clutch actuation device for a manual transmission of a vehicle having a clutch, comprising:
   a clutch actuation setting device operatively configured to be placed in various positions, the clutch actuation setting device generating electrical signals as a function of its position;
   a control unit coupled with the clutch actuation setting device;
   a clutch operating device operatively configured to operate the clutch; and
   a further control unit coupled with the clutch actuation setting device;
   wherein the clutch is correspondingly operated based upon the generated electrical signals;
   wherein the control unit is operatively configured to cause a pressure to be applied to the clutch operating device for operating the clutch based upon the electrical signals received by the control unit from the clutch actuation setting device; and
   wherein the clutch actuation setting device supplies further electrical signals as a function of its position to the further control unit, the further control unit being operatively configured to deliver the further electrical signals to the control unit.

2. The clutch actuation device according to claim 1, further comprising a valve device operatively configured to apply pressure to the clutch operating device.

3. The clutch actuation device according to claim 1, further comprising:
   a travel sensor operatively configured to detect a position of the clutch operating device; and
   wherein the clutch operating device is controlled/regulated on the basis of signals from the travel sensor.

4. The clutch actuation device according to claim 3, further comprising:
   a pressure sensor operatively configured to determine a position of the clutch operating device upon a failure of the travel sensor;
   wherein the clutch operating device is controlled/regulated on the basis of signals from the pressure sensor.

5. The clutch actuation device according to claim 1, further comprising:
   a valve device coupled with the control unit and the clutch operating device;
   a travel sensor operatively configured to detect a position of the clutch operating device; and
   a pressure sensor operatively configured to determine a position of the clutch operating device;
   wherein the clutch operating device is coupled with the control unit; and
   wherein a housing of a mechatronic unit accommodates one or more of the control unit, the valve device, the travel sensor, the pressure sensor, and the clutch operating device.

6. The clutch actuation device according to claim 5, further comprising a housing of a mechatronic unit, the housing of the mechatronic unit accommodating one or more of the control unit, the valve device, the travel sensor, the pressure sensor, and the clutch operating device.

7. The clutch actuation device according to claim 1, wherein the clutch actuation device is for a commercial vehicle having the manual transmission.

8. A method for controlling/regulating a clutch actuation device for a manual transmission of a vehicle having a clutch, the method comprising the acts of:
   generating electrical signals via a clutch actuation setting device, said electrical signals being a function of various positions of the clutch actuation setting device;
   operating the clutch of the manual transmission based on the generated electrical signals;
   delivering the generated electrical signals from the clutch actuation setting device to a control unit;
   causing a pressure to be applied to a clutch operating device for operating the clutch based upon the generated electrical signals delivered to the control unit;
   generating further electrical signals as a function of a position of the clutch actuation setting device;
   delivering the generated further electrical signals to a further control unit; and
   delivering the generated further electrical signals from the further control unit to the control unit.

9. The method according to claim 8, further comprising the act of applying a pressure to the clutch operating device via a valve device coupled to the control unit.

10. The method according to claim 9, further comprising the acts of:
    detecting a position of the clutch operating device via a travel sensor; and
    controlling/regulating the position of the clutch operating device based upon signals from the travel sensor.

11. The method according to claim 10, further comprising the acts of:
    determining a position of the clutch operating device via a pressure sensor at least in an event of a failure of the travel sensor; and
    controlling/regulating the position of the clutch operating device based upon signals from the pressure sensor.

12. The method according to claim 8, further comprising the acts of:
    detecting a position of the clutch operating device via a travel sensor; and
    controlling/regulating the position of the clutch operating device based upon signals from the travel sensor.

13. The method according to claim 12, further comprising the acts of:
    determining a position of the clutch operating device via a pressure sensor at least in an event of a failure of the travel sensor; and
    controlling/regulating the position of the clutch operating device based upon signals from the pressure sensor.

* * * * *